US007157962B2

(12) United States Patent
Gu

(10) Patent No.: US 7,157,962 B2

(45) Date of Patent: Jan. 2, 2007

(54) CHARGE PUMP OUTPUT DEVICE WITH LEAKAGE CANCELLATION

(75) Inventor: Richard Gu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 73 days.

(21) Appl. No.: 10/940,197

(22) Filed: Sep. 13, 2004

(65) Prior Publication Data

US 2006/0055450 A1 Mar. 16, 2006

(51) Int. Cl.
*H03K 17/16* (2006.01)
*H03K 19/003* (2006.01)

(52) U.S. Cl. ...................... 327/590; 327/112; 327/384; 327/576

(58) Field of Classification Search ..................... None
See application file for complete search history.

(56) References Cited

U.S. PATENT DOCUMENTS 6,225,838 B1 * 5/2001 Lee ............................ 327/108
6,292,029 B1 * 9/2001 Kumar et al. ................. 326/98
6,323,701 B1 * 11/2001 Gradinariu et al. ......... 327/109
6,636,083 B1 * 10/2003 Wong et al. .................. 327/94
6,958,636 B1 * 10/2005 Boerstler et al. ........... 327/156

* cited by examiner

*Primary Examiner*—Timothy P. Callahan
*Assistant Examiner*—Terry L. Englund
(74) *Attorney, Agent, or Firm*—Alan K. Stewart; W. James Brady; Frederick J. Telecky, Jr.

(57) ABSTRACT

The charge pump circuit includes: a charge pump output branch; a current leakage device coupled to the output branch; and a feedback device coupled between the output branch and a control node of the current leakage device such that the leakage device cancels leakage current from the output branch.

10 Claims, 1 Drawing Sheet

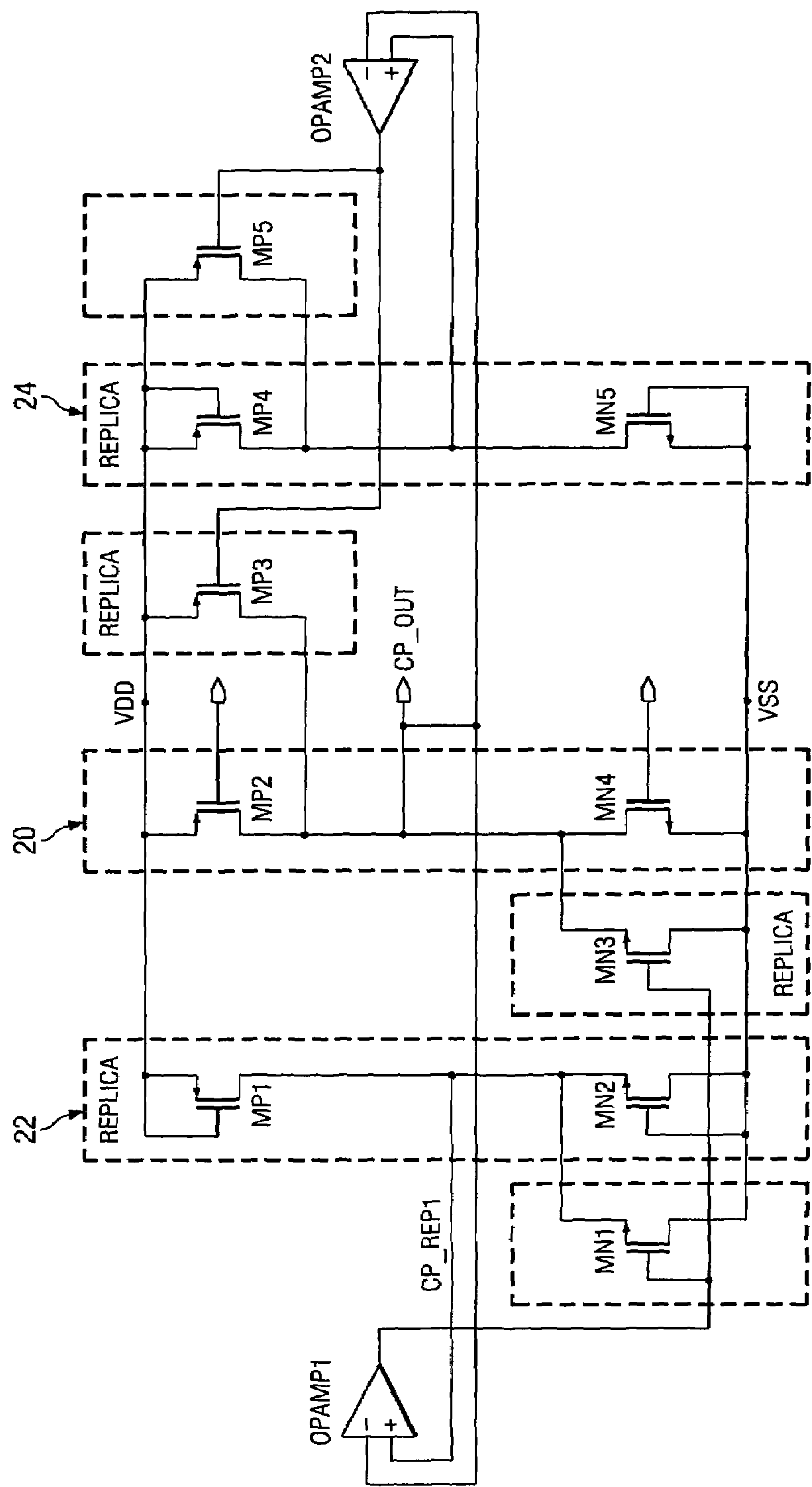
OPAMP2
MP5
24
REPLICA
MP4
MN5
REPLICA
MP3
CP_OUT
VDD
VSS
20
MP2
MN4
MN3
REPLICA
22
REPLICA
MP1
MN2
MN1
CP_REP1
OPAMP1

CHARGE PUMP OUTPUT DEVICE WITH LEAKAGE CANCELLATION

FIELD OF THE INVENTION

The present invention relates to electronic circuitry and, in particular, to a charge pump output with leakage cancellation circuitry.

BACKGROUND OF THE INVENTION

With the scaling down of CMOS technology, leakage current becomes severe, especially in high temperature environments. Leakage current in charge pumps increases phase locked loop (PLL) jitter and in worst case, kills PLL operation.

SUMMARY OF THE INVENTION

The charge pump circuit includes: a charge pump output branch; a current leakage device coupled to the output branch; and a feedback device coupled between the output branch and a control node of the current leakage device such that the leakage device cancels leakage current from the output branch.

BRIEF DESCRIPTION OF THE DRAWINGS

In the drawings:

The Drawing is a circuit diagram of a preferred embodiment charge pump output branch with leakage cancellation circuitry.

DETAILED DESCRIPTION OF PREFERRED EMBODIMENTS

A leakage cancellation circuit according to the present invention is described. The idea is to generate the same amount of current to cancel leakage current in the charge pump. Thus, no charge is accumulated and discharged to the PLL filter.

A circuit schematic of the charge pump with leakage cancellation is shown in the Drawing. Transistors MP2 and MN4 form the output branch 20 of the charge pump. Transistors MP1 and MN2 form a replica branch 22 of transistors MP2 and MN4. The gate of transistor MP1 is connected to source voltage node VDD and the gate of transistor MN2 is connected to source voltage node VSS, which mimic the leakage condition when the charge pump is off. (When PLL is locked, the charge pump is almost off.) Because the leakage current depends on voltage level of output CP_OUT, the amplifier OPAMP1 forces node CP_REP1 equal to output CP_OUT by adjusting the current in transistor MN1 such that I_MP1=I_MN1+I_MN2 (if I_MP1>I_MN2) where I_MP1 is the current in transistor MP1, I_MN1 is the current in transistor MN1, and I_MN2 is the current in transistor MN2. Transistor MN3 (leakage canceller transistor) is a replica of transistor MN1. Thus, in the charge pump output, transistor MN3 sinks net leakage current (transistor MP2 current minus transistor MN4 current). Thus, no charge accumulation in the filter.

For the case where the current in transistor MN4 is greater than the current in transistor MP2, leakage canceller transistor MP3 sources net leakage current and there is no charge discharging in the filter. Transistor MP3 is a replica of transistor MP5. Amplifier OPAMP2, charge pump output replica branch 24 (transistors MP4 and MN5), and transistor MP5 control leakage canceller transistor MP3 similar to the control of leakage canceller transistor MN3 as described above.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A charge pump circuit comprising:

a charge pump output branch;

a current leakage device coupled to the output branch;

a feedback device coupled between the output branch and a control node of the current leakage device such that the leakage device cancels leakage current from the output branch;

the charge pump output branch having a transistor coupled between an output node of the charge pump output branch and a supply node, and coupled in parallel with the current leakage device;

wherein the feedback device comprises an amplifier having a first input coupled to the output node of the charge pump output branch and an output coupled to the control node of the current leakage device; and a charge pump output branch replica having an output coupled to a second input of the amplifier.

2. The circuit of claim 1 further comprising a current leakage device replica coupled to the charge pump output branch replica, and having a control node coupled to the output of the amplifier.

3. A charge pump circuit comprising:

a charge pump output branch;

an output branch replica;

a first current leakage device coupled to the charge pump output branch;

a second current leakage device coupled to the output branch replica and having a control node coupled to a control node of the first current leakage device, wherein the first current leakage device is a replica of the second current leakage device;

a feedback circuit coupled between an output node of the charge pump output branch and the control node of the first current leakage device; and wherein the charge pump output branch comprises:

a first transistor coupled between the output node and a first supply node; and a second transistor coupled between the output node and a second supply node.

4. The circuit of claim 3 wherein the first current leakage device is coupled in parallel with the first transistor.

5. The circuit of claim 3 wherein the first current leakage device is coupled in parallel with the second transistor.

6. The circuit of claim 3 wherein the feedback device comprises an amplifier having a first input coupled to the output node of the charge pump output branch, a second input coupled to an output of the output branch replica, and an output coupled to the control node of the first current leakage device.

7. A charge pump circuit comprising:

a charge pump output branch;

a first output branch replica;

a second output branch replica;

a first current sink device coupled to the charge pump output branch;

a second current sink device coupled to the first output branch replica, wherein the first current sink device is a replica of the second current sink device;

a first current source device coupled to the charge pump output branch;

a second current source device coupled to the second output branch replica, wherein the first current source device is a replica of the second current source device;

a first feedback device coupled between an output node of the charge pump output branch and a control node of the first current sink device, and coupled to an output of the first output branch replica; and a second feedback device coupled between the output node of the charge pump output branch and a control node of the first current source device, and coupled to an output of the second output branch replica.

8. The circuit of claim 7 wherein the charge pump output branch comprises:

a first transistor coupled between the output node and a first supply node; and a second transistor coupled between the output node and a second supply node.

9. The circuit of claim 7 wherein the first feedback device comprises an amplifier having a first input coupled to the output node of the charge pump output branch, a second input coupled to the output of the first output branch replica, and an output coupled to the control node of the first current sink device.

10. The circuit of claim 7 wherein the second feedback device comprises an amplifier having a first input coupled to the output node of the charge pump output branch, a second input coupled to the output of the second output branch replica, and an output coupled to the control node of the first current source device.

* * * * *